(12) United States Patent
Guo et al.

(10) Patent No.: US 12,104,984 B2
(45) Date of Patent: Oct. 1, 2024

(54) TEST DEVICE FOR DETECTING SEALING PERFORMANCE OF ONE-WAY VALVE

(71) Applicant: Tsinghua University, Beijing (CN)

(72) Inventors: Fei Guo, Beijing (CN); Qiyao Chen, Beijing (CN); Chong Xiang, Beijing (CN); Yijie Huang, Beijing (CN); Ganlin Cheng, Beijing (CN); Fan Zhang, Beijing (CN); Xiaohong Jia, Beijing (CN)

(73) Assignee: Tsinghua University, Beijing (CN)

( * ) Notice: Subject to any disclaimer, the term of this patent is extended or adjusted under 35 U.S.C. 154(b) by 284 days.

(21) Appl. No.: 17/751,686

(22) Filed: May 24, 2022

(65) Prior Publication Data
US 2023/0089588 A1    Mar. 23, 2023

(30) Foreign Application Priority Data

Sep. 17, 2021 (CN) .......................... 202111095190.6

(51) Int. Cl.
*G01M 3/28* (2006.01)
*G01M 3/36* (2006.01)

(52) U.S. Cl.
CPC ............ *G01M 3/2876* (2013.01); *G01M 3/36* (2013.01)

(58) Field of Classification Search
CPC ...... G01M 3/086; G01M 3/144; G01M 3/184; G01M 3/224; G01M 3/2876
See application file for complete search history.

(56) References Cited

U.S. PATENT DOCUMENTS

| | | | | |
|---|---|---|---|---|
| 2,707,390 A | * | 5/1955 | Beretish | G01M 3/2876 73/46 |
| 2004/0020269 A1 | | 2/2004 | Brewer | |
| 2020/0109999 A1 | * | 4/2020 | Kira | G01M 3/224 |

FOREIGN PATENT DOCUMENTS

| | | | |
|---|---|---|---|
| CN | 104155098 A | | 11/2014 |
| CN | 107121340 A | * | 9/2017 |
| CN | 108662212 A | | 10/2018 |
| CN | 108776014 A | | 11/2018 |
| CN | 109974946 A | | 7/2019 |
| CN | 209117269 U | * | 7/2019 |
| CN | 110259995 A | | 9/2019 |

(Continued)

OTHER PUBLICATIONS

English Translation of CN 211527739 (Year: 2020).*

(Continued)

*Primary Examiner* — Alexander A Mercado
(74) *Attorney, Agent, or Firm* — KILPATRICK TOWNSEND & STOCKTON LLP (57) ABSTRACT

Embodiments of the present disclosure belong to the field of valve sealing, and in particular, relate to a test device for simulating sealing performance of a one-way valve. A box is provided with a gas inlet pipe and a gas outlet pipe, the gas inlet pipe is communicated with a gas source, a detection device is communicated with the gas outlet pipe, the detection device is used to detect detection gas input into the box by the gas source, a sleeve is connected to the gas inlet pipe, one end of the sleeve is communicated with the gas source, the other end of the sleeve has a gas outlet, one end of a fitting piece is used to block the gas outlet, and the other end of the fitting piece is connected to a driving member, which is used to drive the fitting piece to move and rotate.

20 Claims, 4 Drawing Sheets

(56) References Cited

FOREIGN PATENT DOCUMENTS

| | | | | |
|---|---|---|---|---|
| CN | 110501121 A | * | 11/2019 | ............ G01M 3/224 |
| CN | 209910924 U | | 1/2020 | |
| CN | 110886868 A | | 3/2020 | |
| CN | 210375558 U | | 4/2020 | |
| CN | 111458078 A | | 7/2020 | |
| CN | 211527739 U | * | 9/2020 | |
| CN | 112326143 A | | 2/2021 | |
| CN | 213411723 U | | 6/2021 | |
| CN | 213456007 U | | 6/2021 | |
| CN | 213776474 U | | 7/2021 | |
| GB | 2239711 A | | 7/1991 | |
| JP | 2011033110 A | | 2/2011 | |
| JP | 2019086327 A | * | 6/2019 | |

OTHER PUBLICATIONS

Ding, Wanrong, "Improve check valve sealing performance", published on "Mechanician", p. 42, Jan. 31, 1989.
Wang, Ying et al., "The design of check valve sealing test equipment", published on the first issue of "Hydraulics and Pneumatics", p. 59-61, Dec. 31, 2012.
Notice of Grant of Invention Patent received in the corresponding Chinese application 202111095190.6 on May 31, 2022.

* cited by examiner

TEST DEVICE FOR DETECTING SEALING PERFORMANCE OF ONE-WAY VALVE

CROSS-REFERENCE TO RELATED APPLICATIONS

This application claims priority to Chinese Patent Application No. 202111095190.6, filed on Sep. 17, 2021 and entitled "TEST DEVICE FOR SIMULATING SEALING PERFORMANCE OF ONE-WAY VALVE", which is hereby incorporated by reference in its entirety.

TECHNICAL FIELD

Embodiments of the present disclosure belong to the field of valve sealing, and in particular, relate to a test device for simulating sealing performance of a one-way valve.

BACKGROUND

A one-way valve, also known as a check valve or a non-return valve, is a kind of directional control valve. Function of a one-way valve is to make internal fluid move in only one direction and be not able to flow back. Therefore, one-way valves are widely used in various engineering machinary.

A one-way valve is usually provided with a gas inlet and a gas outlet, and a valve core that is used to block the gas inlet is also provided at a position rightly opposite to the gas inlet. When fluid flows in from the gas inlet, the valve core is pushed by a pressure of the fluid, so that the fluid enters the one-way valve and then flows out from the gas outlet. When fluid flows in from the gas outlet, the valve core is pushed by the fluid to seal the gas inlet, preventing the fluid from flowing back. It can be seen that when a centerline of the valve core is angularly deflected relative to a centerline of the gas inlet, the one-way valve may leak.

In related art, there is also a lack of a relevant device to test sealing performance of a one-way valve, which cannot provide data support for structural design of the one-way valve.

SUMMARY

Embodiments of the present disclosure provide a test device for simulating sealing performance of a one-way valve, which is used to fill a void that a test device for simulating sealing performance of a one-way valve is lacked in related arts.

An embodiment of the present disclosure provides a test device for simulating sealing performance of a one-way valve, including:

a box, provided with a gas inlet pipe and a gas outlet pipe, where the gas inlet pipe is communicated with a gas source;

a detection device, communicated with the gas outlet pipe, where the detection device is used to detect detection gas input into the box by the gas source;

a sleeve, being connected to the gas inlet pipe, where one end of the sleeve is communicated with the gas source, and the other end of the sleeve has a gas outlet;

a fitting piece, where one end of the fitting piece is used to block the gas outlet;

a driving member, connected with the box and also with the other end of the fitting piece, where the driving piece is used to drive the fitting piece to move and rotate.

In a possible implementation, a first guide member and a second guide member are further included, where the second guide member is connected to the driving member, the second guide member has a sliding channel, the first guide member is slidably arranged in the sliding channel, the fitting piece is arranged at one end of the first guide member, and the other end of the first guide member abuts against the driving member.

In a possible implementation, the driving member includes a lifting device and a rotating device that is connected to the lifting device, the lifting device is connected to the box, the rotating device is connected to the fitting piece, the lifting device is used to drive the rotating device to move in a vertical direction, and the rotating device is used to drive the fitting piece to rotate.

In a possible implementation, the rotating device includes a first angular stage and a second angular stage, where the first angular stage is used to drive carrying platform thereof to rotate reciprocally around a first axis of symmetry within a first angle range, the second angular stage is used to drive carrying platform thereof to rotate reciprocally around a second axis of symmetry within a second angle range, the first axis of symmetry is perpendicular to the second axis of symmetry, and the first angular stage is connected to the carrying platform of the second angular stage.

In a possible implementation, the lifting device includes a lifting cylinder, and a piston rod of the lifting cylinder is connected to the second angular stage.

In a possible implementation, an inclination sensor is further included, where the inclination sensor is connected to the first guide member and used to detect a deflection angle of the fitting piece relative to the vertical direction.

In a possible implementation, a pressure sensor is further included, where one end of the pressure sensor abuts against the first guide member, the other end of the pressure sensor abuts against the first angular stage, and the pressure sensor is used to detect a pressure between the fitting piece and the sleeve.

In a possible implementation, a control device is further included, where the lifting device, the rotating device, the inclination sensor and the pressure sensor are all electrically connected to the control device, the control device is used to control the rotating device to drive the fitting piece to deflect to a preset angle and store the deflection angle detected by the inclination sensor; the control device is further used to control the lifting device to drive the fitting piece to mate with the sleeve and store the pressure detected by the pressure sensor.

In a possible implementation, a guide block is further included, where the guide block is arranged in the gas inlet pipe and in an interference fit with the gas inlet pipe, the guide block further has a guide channel, and the sleeve is inserted into the guide channel and in an interference fit with the guide block.

In a possible implementation, a three-way valve and a gas extraction device are further included, where a first valve of the three-way valve is communicated with the gas outlet pipe, a second valve of the three-way valve is communicated with the detection device, and a third valve of the three-way valve is communicated with the gas extraction device.

An embodiment of the present disclosure provides a test device for simulating sealing performance of a one-way valve, including a box, a detection device, a sleeve, a fitting piece and a driving member, where the box is provided with a gas inlet pipe and a gas outlet pipe, the gas inlet pipe is communicated with a gas source, the detection device is communicated with the gas outlet pipe, the detection device is used to detect detection gas input into the box by the gas source, the sleeve is connected to the gas inlet pipe, one end of the sleeve is communicated with the gas source, the other end of the sleeve has a gas outlet, one end of the fitting piece is used to block the gas outlet, and the other end of the fitting piece is connected to the driving member, which is used to drive the fitting piece to move and rotate. After the driving member drives the fitting piece to mate with the sleeve, the gas source passes the detection gas into the box, and the detection device obtains a leakage rate of a sealing structure between the fitting piece and pipe body by detecting the detection gas flowing out from the gas outlet pipe.

BRIEF DESCRIPTION OF THE DRAWINGS

In order to more clearly illustrate the technical solutions in the embodiments of the present disclosure or in the prior art, the following will briefly introduce the accompanying drawings required to be used in the description of the embodiments or of the prior art. Obviously, the accompanying drawings in the following description are some embodiments of the present disclosure. For those of ordinary skill in the art, other drawings can further be obtained based on these drawings without paying creative labor.

ILLUSTRATION OF REFERENCE NUMERALS 10, box; 11, gas inlet pipe; 12, gas outlet pipe; 13, double flanged pipe; 14, pressure reducing valve; 15, three-way valve; 151, first valve; 152, second valve; 153, third valve; 16, driving member;
20, sleeve; 201, gas outlet hole; 21, guide block;
30, fitting piece; 301, stop ring; 31, first guide member; 311, mounting slot; 312, first blocking part; 32, second guide member; 321, sliding channel; 33, mounting seat;
41, inclination sensor; 42, pressure sensor;
51, first angular stage; 52, second angular stage; 53, lifting device; 531, lifting cylinder; 5311, piston rod;
60, detection device;
70, gas extraction device;
80, control device.

DESCRIPTION OF EMBODIMENTS

A one-way valve is usually provided with a gas inlet and a gas outlet, and a valve core used to block the gas inlet is also arranged at a position rightly opposite to the gas inlet. When a centerline of the valve core is angularly deflected relative to a centerline of the gas inlet, the one-way valve may leak. There are usually three reasons for the deflection: a valve seat in the one-way valve is skewed, which causes the valve core to deflect; a guide clearance of a guide device of the valve core is large, which causes the valve core to deflect relative to the guide device; the influence of external temperature environment. There is also a lack of a relevant device to test sealing performance of a one-way valve in related art, which cannot provide data support for structural design of the one-way valve.

In view of this, an embodiment of the present disclosure provides a test device for simulating sealing performance of a one-way valve, including a detection device a sleeve and a fitting piece, where the detection device is communicated with a gas outlet pipe and used to detect detection gas input into the box by the gas source, the sleeve is connected to a gas inlet pipe, one end of the sleeve is communicated with the gas source, the other end of the sleeve has a gas outlet, one end of the fitting piece is used to block the gas outlet, and the other end of the fitting piece is connected to a driving member, which is used to drive the fitting piece to move and rotate. After the driving member mates with the sleeve, the gas source passes the detection gas into the box, and the detection device obtains a leakage rate of the sealing structure between the fitting piece and pipe body through detecting the detection gas flowing out from the gas outlet pipe.

Several optional implementations of the present disclosure will be introduced below in combination with the accompanying drawings. It should be understood by those skilled in the art that the following implementations are only illustrative, not an exhaustive enumeration. On the basis of these implementations, those skilled in the art can substitute, splice or combine some features or some examples, which should still be regarded as the disclosure of the present disclosure.

Figure 1:
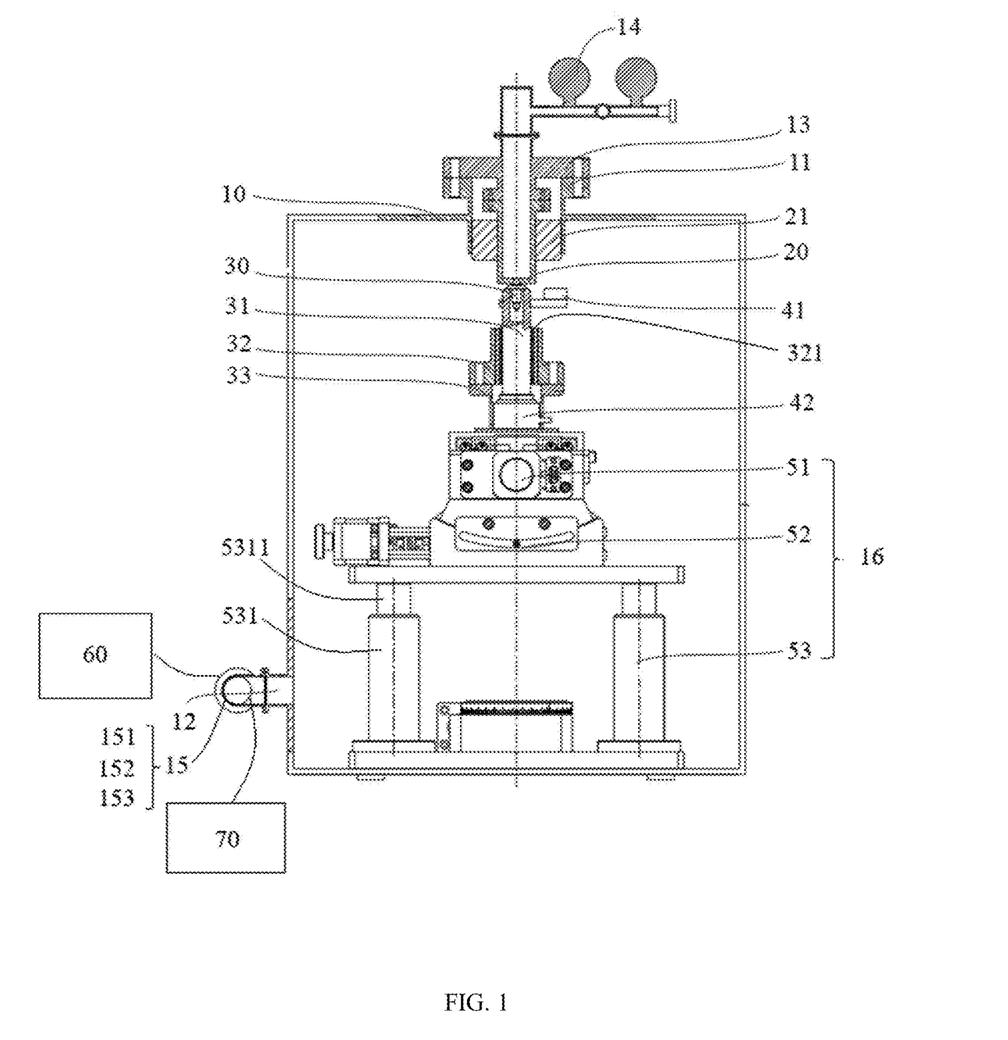
FIG. 1 is a schematic structural diagram of a test device for simulating sealing performance of a one-way valve according to an embodiment of the present disclosure.

As shown in FIG. 1, a test device for simulating sealing performance of a one-way valve provided in an embodiment of the present disclosure includes a box 10, a detection device 60, and a sleeve 20, a fitting piece 30 and a driving member 16 arranged inside the box 10.

Exemplarily, the box 10 may be a cubic structure, or a cylindrical structure, which can be specifically designed according to actual needs. In the illustrated position, a gas inlet pipe 11 may be provided at the top of the box 10, and a gas outlet pipe 12 may be provided at the side wall of the bottom of the box 10. The gas inlet pipe 11 is communicated with a gas source, the gas outlet pipe 12 is communicated with the detection device 60, detection gas used to test sealing performance is in the gas source, and the detection device 60 is used to detect the detection gas input into the box 10 by the gas source. Upon the above structure arrangement, the gas source passes the detection gas into the box 10 through the gas inlet pipe 11, and the detection gas in the box 10 can enter the detection device 60 through the gas outlet pipe 12.

Figure 2:
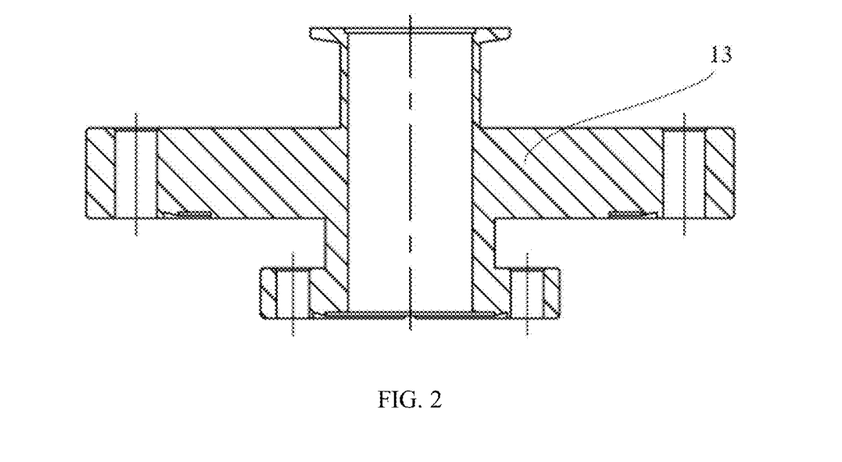
FIG. 2 is a schematic structural diagram of a double flanged pipe according to an embodiment of the present disclosure.

Specifically, referring to FIG. 2, a double flanged pipe 13 may be provided in the box 10, one end of the flanged pipe 13 is threadedly connected to a flange joint of the gas inlet pipe 11, the pipeline of the double flanged pipe 13 is communicated with the gas source, and the other end of the double flanged pipe 13 extends into the gas inlet pipe 11 for connecting to the sleeve 20. Correspondingly, referring to FIG. 3, the sleeve 20 has a flange joint for threaded connection to the double flanged pipe 13. Further, a gasket is also provided between the double flanged pipe 13 and the sleeve 20, and the gasket, for example, can be made of high vacuum oxygen-free copper sheet, so as to improve sealing performance between the double flanged pipe 13 and the sleeve 20 and prevent the detection gas from leaking.

Figure 3:
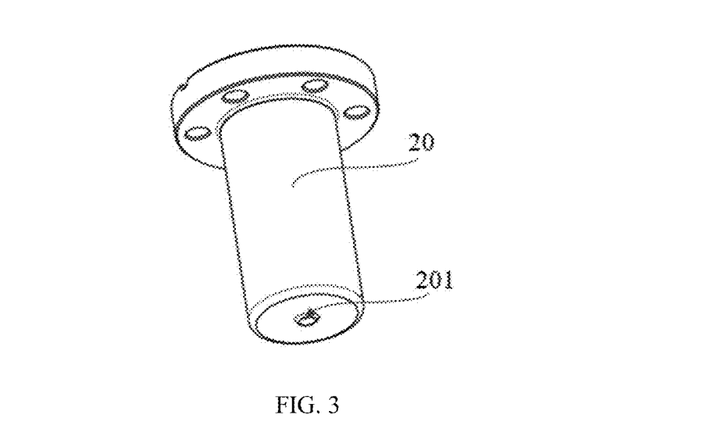
FIG. 3 is a schematic structural diagram of a sleeve according to an embodiment of the present disclosure.

Further, the sleeve 20 and the double flanged pipe 13 are both hard pipes, so that the sleeve 20 and the double flanged pipe 13 have sufficient rigidity to prevent the sleeve 20 from being deformed. An outer wall of the sleeve 20 is tightly connected to an inner wall of the gas inlet pipe 11, and the end of the sleeve 20 facing away from the double flanged pipe 13 has a gas outlet, so that the detection gas in the gas source can enter the sleeve 20 through the double flanged pipe 13 and flow out from the gas outlet of the sleeve 20.

It should be noted that, by designing the sleeve 20 of different structures, leakage rates of a sealing structure between the sleeve 20 under different structures and the fitting piece 30 can be tested. Similarly, by designing sleeves 20 of different materials, leakage rates of the sealing structure between the sleeves 20 made of different materials and the fitting piece 30 can be tested.

Optionally, the test device for simulating sealing performance of a one-way valve further includes a guide block 21, which is provided in the gas inlet pipe 11 and in an interference fit with the gas inlet pipe 11, the guide block 21 also has a guide channel, into which the sleeve 20 is inserted, and the sleeve 20 is in an interference fit with the guide block 21. Exemplarily, the guide block 21 is substantially a cylindrical structure and has a guide channel, and a centerline of the guide channel coincides with a centerline of the sleeve 20, so as to further fix and support the sleeve 20.

In the present embodiment, the detection gas passed into the gas source may be helium, and correspondingly, the detection device 60 is a helium mass spectrometer leak detector. It should be noted that, the helium mass spectrometer leak detector obtains the leakage rate of the sealing structure between the sleeve 20 and the fitting piece 30 through the number of helium atoms in extracted gas. It is worth noting that helium is usually stored in a high-pressure state. In the present embodiment, the gas inlet pipe 11 can also be provided with a pressure reducing valve 14, so as to adjust a pressure of the helium entering the box 10 and keep it within a stable range.

Figure 4:
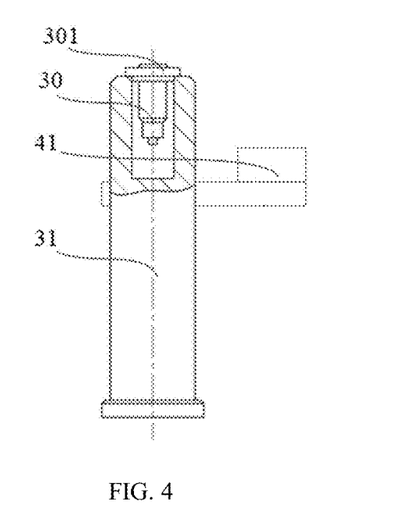
FIG. 4 is a schematic structural diagram of a first guide member and an inclination sensor according to an embodiment of the present disclosure.
Figure 5:
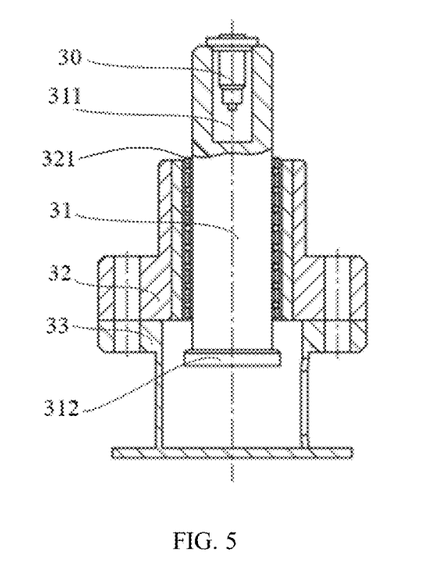
FIG. 5 is a schematic structural diagram of a first guide member, a second guide member and a mounting seat according to an embodiment of the present disclosure.

Exemplarily, referring to FIG. 4 and FIG. 5, the fitting piece 30 is used to block the gas outlet. A shape of the fitting piece 30 should be designed according to practical applications. For example, the fitting piece 30 may be substantially a columnar structure. One end of the fitting piece 30 is used to be inserted into the gas outlet, so that the fitting piece 30 blocks the gas outlet, and the other end of the fitting piece 30 is connected to the driving member 16, so that the driving member 16 drives the fitting piece 30 to move and rotate, thereby making the fitting piece 30 mate with the gas outlet. The middle of the fitting piece 30 is also provided with a stop ring 301, and a cross-sectional area of the stop ring 301 is larger than a cross-sectional area of the gas outlet, so that the stop ring 301 can abut against the end of the sleeve 20 away from the double flanged pipe 13.

In the illustrated position, the driving member 16 is connected to the bottom of the box 10, and the top of the driving member 16 is connected to the fitting piece 30, so as to drive the fitting piece 30 to move and rotate. In a possible implementation, the driving member 16 can be, for example, a mechanical arm. By controlling the mechanical arm, a moving distance and a rotation angle of the fitting piece 30 are controlled, so that the fitting piece 30 is inserted into the gas outlet hole 201.

An embodiment of the present disclosure provides a test device for simulating sealing performance of a one-way valve, including a box 10, a detection device 60, a sleeve 20, a fitting piece 30 and a driving member 16. The box 10 is provided with a gas inlet pipe 11 and a gas outlet pipe 12, the gas inlet pipe 11 is communicated with a gas source, and the detection device 60 is communicated with the gas outlet pipe 12. The detection device 60 is used to detect detection gas input into the box by the gas source, and the sleeve 20 is connected to the gas inlet pipe 11. One end of the sleeve 20 is communicated with the gas source, and the other end of the sleeve 20 has a gas outlet. One end of the fitting piece 30 is used to block the gas outlet, and the other end of the fitting piece 30 is connected to the driving member 16, which is used to drive the fitting piece 30 to move and rotate. After the driving member 16 drives the fitting piece 30 to mate with the sleeve 20, the gas source passes the detection gas into the box 10, and the detection device 60 obtains leakage rate of sealing structure between the fitting piece 30 and pipe body by detecting the detection gas flowing out from the gas outlet pipe 12.

In the present embodiment, the test device for simulating sealing performance of a one-way valve further includes a first guide member 31 and a second guide member 32. The first guide member 31 and the second guide member 32 are used to guide when the driving member 16 drives the fitting piece 30 to move. The second guide member 32 is connected to the driving member 16 and has a sliding channel 321. The first guide member 31 is slidably arranged in the sliding channel 321, the fitting piece 30 is arranged at one end of the first guide member 31, and the other end of the first guide member 31 abuts against the driving member 16.

Exemplarily, referring to FIG. 4 and FIG. 5, the first guide member 31 may be a substantially cylindrical structure, one end of the first guide member 31 facing away from the driving member 16 has a mounting slot 311, some of the fitting piece 30 are inserted into the mounting slot 311, and the stop ring 301 of the fitting piece 30 also abuts against the first guide member 31. Since the fitting piece 30 needs to be replaced frequently, by inserting the fitting piece 30 into the mounting slot 311, the fitting piece 30 can be easily disassembled and assembled. Further, the first guide member 31 also has a first blocking part 312, which is provided at one end of the first guide member 31 facing away from the mounting slot 311, so as to prevent the first guide member 31 from being separated from the sliding channel 321.

Correspondingly, the second guide member 32 may be substantially a tubular structure, and the tubular structure has a sliding channel 321 for the first guide member 31 to slide. An inner wall of the second guide member 32 may be provided with a plurality of balls through a supporting frame, so that an outer wall of the first guide member 31 can abut against the balls. Rolling friction can be performed between the first guide member 31 and the balls, so that the first guide member 31 can move along the sliding channel 321. Specifically, centerlines of the fitting piece 30, the first guide member 31 and the second guide member 32 are all coincident.

In the present embodiment, referring to FIG. 5, there is further provided a mounting seat 33, through which the second guide member 32 is connected to the driving member 16. The mounting seat 33 can also be a box-shaped structure, one end of the mounting seat 33 facing away from the driving member 16 is threadedly connected to the second guide member 32, and correspondingly, one end of the second guide member 32 close to the mounting 33 has a flange joint. In a possible implementation, the first blocking part 312 of the first guide member 31 may be located in the box-shaped structure of the mounting seat 33, so that a bottom wall of the mounting seat 33 can abut.

In the present embodiment, the driving member 16 includes a lifting device 53 and a rotating device connected to the lifting device 53. The lifting device 53 is connected to the box 10, and the rotating device is connected to the fitting piece 30. The lifting device 53 is used to drive the rotating device to move in a vertical direction, and the rotating device is used to drive the fitting piece 30 to rotate, so that the driving member 16 can drive the fitting piece 30 to move and rotate, and the driving member 16 can be inserted into the gas outlet hole 201 of the sleeve 20.

In the present embodiment, the rotating device includes a first angular stage 51 and a second angular stage 52. The first angular stage 51 is used to drive carrying platform thereof to rotate reciprocally around a first axis of symmetry within a first angle range, and the second angular stage 52 is used to drive carrying platform thereof to rotate reciprocally around a second axis of symmetry within a second angle range. The first axis of symmetry is perpendicular to the second axis of symmetry, and the first angular stage 51 is connected to the carrying platform of the second angular platform 52.

It should be noted that an angular stage is a platform that can precisely rotate an object within a small angle. Both the first axis of symmetry and the second axis of symmetry are parallel to a horizontal plane. In the illustrated position, the first angular stage 51 is connected to the carrying platform of the second angular stage 52, the first angular stage 51 is located at the upper end of the second angular stage 52. By using the first angular stage 51 and the second angular stage 52 in combination, the rotating device can drive the fitting piece 30 to rotate at any angle, so that leakage rates of the sealing structure between the fitting piece 30 under different deflection angles and the pipe body are obtained.

In some other examples, the rotating device can also be a drive motor, of which the output shaft is connected to the fitting piece 30, so that the driving motor drives the fitting piece 30 to rotate.

Exemplarily, the lifting device 53 may include a lifting cylinder 531, a piston rod 5311 of the lifting cylinder 531 is connected to the second angular stage 52, so that the lifting device 53 can drive the rotating device to move in the vertical direction, and then drive the fitting piece 30 to be inserted into the gas outlet of the sleeve 20, or drive the fitting piece 30 to be separated from the sleeve 20. Further, the lifting device 53 can also adjust a pressure between the fitting piece 30 and the sleeve 20. It should be noted that the lifting device 53 may be provided with a plurality of lifting cylinders 531, so as to further improve stability of the rotating device.

Optionally, referring to FIG. 4, the test device for simulating sealing performance of a one-way valve further includes an inclination sensor 41. The inclination sensor 41 is connected to the first guide member 31, and the inclination sensor 41 is used to detect a deflection angle of the fitting piece 30 relative to the vertical direction, so as to measure the deflection angle of the fitting piece 30 in real time. The fitting piece 30 is driven to rotate by the driving member 16, and then the deflection angle of the fitting piece 30 is adjusted, thereby obtaining the leakage rate of the sealing structure between the fitting piece 30 under different deflection angles and the pipe body.

Optionally, referring to FIG. 1, the test device for simulating sealing performance of a one-way valve further includes a pressure sensor 42. One end of the pressure sensor 42 abuts against the first guide member 31, the other end of the pressure sensor 42 abuts against the first angular stage 51, and the pressure sensor 42 is used to detect the pressure between the fitting piece 30 and the sleeve 20.

In the embodiment where the test device for simulating sealing performance of a one-way valve includes the mounting seat 33, the pressure sensor 42 can be provided inside the mounting seat 33, one end of the pressure sensor 42 abuts against the first blocking part 312 of the first guide member 31, and the other end of the pressure sensor 42 abuts against the bottom wall of the mounting seat 33. By testing a pressure on the first guide member 31, the pressure between the fitting piece 30 and the sleeve 20 can be calculated. The fitting piece 30 is driven to move by the driving member 16, and then the pressure between the fitting piece 30 and the sleeve 20 is adjusted, so that the leakage rate of the sealing structure under different pressures between the fitting piece 30 and the sleeve 20 is obtained.

Optionally, a three-way valve 15 and a gas extraction device 70 are further included. A first valve 151 of the three-way valve is communicated with the gas outlet pipe 12, a second valve 152 of the three-way valve is communicated with the detection device 60, and a third valve 153 of the three-way valve is communicated with the gas extraction device 70.

Exemplarily, when the first valve 151 controls the gas inlet pipe 11 to be disconnected, a closed space can be formed in the box 10 to prevent the detection gas in the box 10 from overflowing. When the first valve 151 controls the gas inlet pipe 11 to be connected, gas in the box 10 can enter the detection device 60 or the gas extraction device 70 from the gas outlet pipe 12. Further, when the third valve 153 is communicated with the gas extraction device 70, the gas extraction device 70 can extract the gas in the box 10, so that a vacuum environment can be formed in the box 10. Alternatively, when the second valve 152 is communicated with the detection device 60, the detection device 60 can detect the detection gas discharged from the gas outlet pipe 12, so as to determine the sealing performance between the sleeve 20 and the fitting piece 30. In a possible implementation, the gas extraction device 70 may be a vacuum pump or a vacuum generator.

Figure 6:
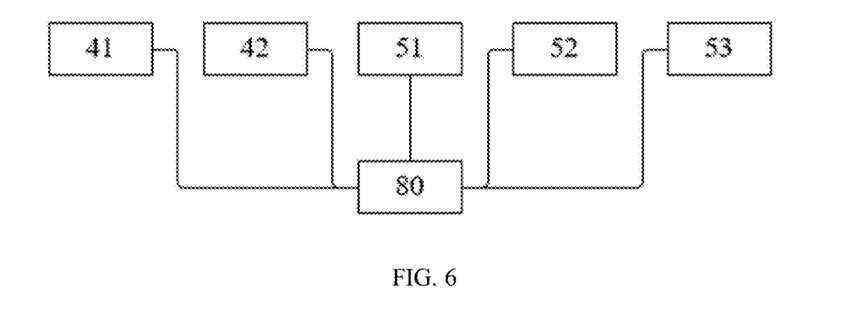
FIG. 6 is a schematic diagram showing an electric connection between a control device and an inclination sensor, a pressure sensor, a first angular stage, a second angular stage and a lifting device according to an embodiment of the present disclosure.

Optionally, a control device 80 may further be included. As shown in FIG. 6, the lifting device 53, the rotating device, the inclination sensor 41 and the pressure sensor 42 are all electrically connected to the control device 80. The control device 80 is used to control the rotating device to drive the fitting piece 30 to deflect to a preset angle, and store the deflection angle detected by the inclination sensor 41; the control device 80 is also used to control the lifting device 53 to drive the fitting piece 30 to mate with the sleeve 20 and store the pressure detected by the pressure sensor 42.

Exemplarily, the control device 80 controls the rotating device and the lifting device 53 to drive the fitting piece 30 to mate with the sleeve 20. When the pressure sensor 42 detects that the pressure between the fitting piece 30 and the sleeve 20 reaches a preset value, the control device 80 controls the lifting device 53 to stop moving, and stores both the pressure detected by the pressure sensor 42 and the deflection angle detected by the inclination sensor 41.

It should be noted that the test device for simulating sealing performance of a one-way valve can further be provided with an industrial camera, of which the lens is made to face the fitting piece 30, so that the industrial camera can monitor a deformation degree of the fitting piece 30 in real time, so as to ensure that the deformation degree of the fitting piece 30 is within a normal range, thus avoiding deformation value of the fitting piece 30 exceeding a normal value due to excessive pressure. Further, the industrial camera can also be electrically connected to the control device 80, so that the control device 80 can store the deformation degree of the fitting piece 30 recorded by the industrial camera. In addition, by studying the deformation degree of the fitting piece 30, it is also beneficial to test a relationship between the pressure on the fitting piece 30 and a service life of the fitting piece 30.

In some other examples, after detection operation is completed, the fitting piece 30 can be disassembled, then an industrial camera is used to observe end face indentation of the fitting piece 30, so as to study pressure distribution of the fitting piece 30 under different deflection angles, different pressures and different structures of the sleeve 20, and further to study the leakage rate of the sealing structure between the fitting piece 30 and the sleeve 20 under different pressure distributions.

The following briefly describes the process of using the test device for simulating sealing performance of a one-way valve provided by the embodiment of the present disclosure:

The first valve 151 and the third valve 153 of the three-way valve 15 are first opened, the gas extraction device 70 is then used to extract the gas in the box 10; after a vacuum space is formed in the box 10, the first valve 151 and the third valve 153 of the three-way valve 15 are closed. Then the control device 80 controls the driving member 16 to drive the fitting piece 30 to mate with the sleeve 20, and stores the deflection angle detected by the inclination sensor 41 and the pressure detected by the pressure sensor 42.

Next, the pressure reducing valve 14 is opened, so that high-pressure helium enters the sleeve 20 through the gas inlet pipe 11. Since there is a gap between the sleeve 20 and the fitting piece 30, part of the helium can leak into the box 10 through the gas outlet hole 201 of the sleeve 20. Then, the first valve 151 and the second valve 152 of the three-way valve 15 are opened, and the detection device 60 is used to detect the detection gas discharged from the gas outlet pipe 12, thus the leakage rate of the sealing structure between the fitting piece 30 and the sleeve 20 is obtained.

In the description of the embodiment of the present disclosure, it should be understood that orientations or positional relationships indicated by the terms "center", "longitudinal", lateral", "length", "width", "thickness", "upper", "lower", "front", "back", "left", "right", "vertical", "horizontal", "top", "bottom", "inside", "outside", "clockwise", "counterclockwise", "axial", "radial", "circumferential", etc. are based on an orientation or a positional relationship shown in the accompanying drawings, and it is only for convenience of describing the present disclosure and simplifying the description, rather than indicating or implying that a referred device or element must have a specific orientation, be constructed and operated in a specific orientation, so it should not be construed as a limitation of the present disclosure.

In addition, the terms "first" and "second" are only used for descriptive purposes, and should not be construed as indicating or implying relative importance or implying the number of indicated technical features. Thus, a feature defined with "first", "second" may expressly or implicitly include at least one such feature. In the description of the embodiment of the present disclosure, "plurality" indicates at least two, such as two, three, etc., unless otherwise expressly and specifically defined.

In the embodiment of the present disclosure, unless otherwise expressly specified and limited, the terms "installation", "communication", "connection", "fixing" should be understood broadly; for example, it can be fixedly connected, detachably connected, or integrated; it can be directly connected, or indirectly connected through an intermediate medium, and it can be internal communication between two elements or an interaction relationship between the two elements, unless otherwise explicitly specified. For those of ordinary skill in the art, specific meanings of the above terms in the present disclosure can be understood based on a specific situation.

In the description of the present specification, the description with reference to the terms "one embodiment" "some embodiments" "example" "specific example" or "some examples", etc. indicates that a particular feature, structure, material, or characteristic described in connection with this embodiment or example is included in at least one embodiment or example of the present disclosure. In the present specification, schematic representations of the above terms are not necessarily directed to the same embodiment or example. Furthermore, the particular feature, structure, material or characteristic described may be combined in any suitable manner in any one or more embodiments or examples. In addition, those skilled in the art can combine different embodiments or examples and features of different embodiments or examples described in the present specification without contradicting each other.

Finally, it should be noted that the above embodiments are merely used to illustrate, instead of limiting the technical solutions of the present disclosure. Although the present disclosure has been illustrated in detail with reference to the above-mentioned embodiments, a person ordinarily skilled in the art should understand: the technical solution described in the above-mentioned embodiments may be modified, or some or all of the technical features thereof may be equivalently substituted, and these modifications and substitutions should do not cause essence of corresponding technical solutions depart from the scope of the technical solution of the embodiments of the present disclosure.

What is claimed is:

1. A test device for detecting sealing performance of a one- way valve, comprising:
    a box, provided with a gas inlet pipe and a gas outlet pipe, wherein the gas inlet pipe is communicated with a gas source;
    a detection device, communicated with the gas outlet pipe, wherein the detection device is used to detect detection gas input into the box by the gas source;
    a sleeve, connected to the gas inlet pipe, wherein one end of the sleeve is communicated with the gas source, and the other end of the sleeve has a gas outlet;
    a fitting piece, wherein one end of the fitting piece is used to block the gas outlet;
    a driving member, connected to the box, wherein the driving member is also connected to the other end of the fitting piece and used to drive the fitting piece to move and rotate;
    wherein the sealing performance is characterized by a leakage rate of a sealing structure between the sleeve and the fitting piece.

2. The test device for detecting sealing performance of a one-way valve according to claim 1, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

3. The test device for detecting sealing performance of a one-way valve according to claim 1, further comprising a guide block, wherein the guide block is provided inside the gas inlet pipe and in an interference fit with the gas inlet pipe, the guide block further has a guide channel, and the sleeve is inserted into the guide channel and in an interference fit with the guide block.

4. The test device for detecting sealing performance of a one-way valve according to claim 1, further comprising a first guide member and a second guide member, wherein the second guide member is connected to the driving member, the second guide member has a sliding channel, the first guide member is slidebaly arranged in the sliding channel, the fitting piece is provided at one end of the first guide member, and the other end of the first guide member abuts against the driving member.

5. The test device for detecting sealing performance of a one-way valve according to claim 4, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

6. The test device for detecting sealing performance of a one-way valve according to claim 4, further comprising a guide block, wherein the guide block is provided inside the gas inlet pipe and in an interference fit with the gas inlet pipe, the guide block further has a guide channel, and the sleeve is inserted into the guide channel and in an interference fit with the guide block.

7. The test device for detecting sealing performance of a one-way valve according to claim 4, wherein the driving member comprises a lifting device and a rotating device that is connected to the lifting device, the lifting device is connected to the box, the rotating device is connected to the fitting piece, the lifting device is used to drive the rotating device to move in a vertical direction, and the rotating device is used to drive the fitting piece to rotate.

8. The test device for detecting sealing performance of a one-way valve according to claim 7, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

9. The test device for detecting sealing performance of a one-way valve according to claim 7, further comprising a guide block, wherein the guide block is provided inside the gas inlet pipe and in an interference fit with the gas inlet pipe, the guide block further has a guide channel, and the sleeve is inserted into the guide channel and in an interference fit with the guide block.

10. The test device for detecting sealing performance of a one-way valve according to claim 7, wherein the rotating device comprises a first angular stage and a second angular stage, the first angular stage is used to drive carrying platform thereof to rotate reciprocally around a first axis of symmetry within a first angle range, the second angular stage is used to drive carrying platform thereof to rotate reciprocally around a second axis of symmetry within a second angle range, the first axis of symmetry is perpendicular to the second axis of symmetry, and the first angular stage is connected to the carrying platform of the second angular stage.

11. The test device for detecting sealing performance of a one-way valve according to claim 10, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

12. The test device for detecting sealing performance of a one-way valve according to claim 10, further comprising a guide block, wherein the guide block is provided inside the gas inlet pipe and in an interference fit with the gas inlet pipe, the guide block further has a guide channel, and the sleeve is inserted into the guide channel and in an interference fit with the guide block.

13. The test device for detecting sealing performance of a one-way valve according to claim 10, wherein the lifting device comprises a lifting cylinder, and a piston rod of the lifting cylinder is connected to the second angular stage.

14. The test device for detecting sealing performance of a one-way valve according to claim 13, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

15. The test device for detecting sealing performance of a one-way valve according to claim 13, further comprising a guide block, wherein the guide block is provided inside the gas inlet pipe and in an interference fit with the gas inlet pipe, the guide block further has a guide channel, and the sleeve is inserted into the guide channel and in an interference fit with the guide block.

16. The test device for detecting sealing performance of a one-way valve according to claim 13, further comprising an inclination sensor, wherein the inclination sensor is connected to the first guide member, and the inclination sensor is used to detect a deflection angle of the fitting piece relative to the vertical direction.

17. The test device for detecting sealing performance of a one-way valve according to claim 16, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

18. The test device for detecting sealing performance of a one-way valve according to claim 16, further comprising a pressure sensor, wherein one end of the pressure sensor abuts against the first guide member, the other end of the pressure sensor abuts against the first angular stage, and the pressure sensor is used to detect pressure between the fitting piece and the sleeve.

19. The test device for detecting sealing performance of a one-way valve according to claim 18, further comprising a control device, wherein the lifting device, the rotating device, the inclination sensor and the pressure sensor are all electrically connected to the control device, and the control device is used to control the rotating device to drive the fitting piece to deflect to a preset angle and store the deflection angle detected by the inclination sensor;

the control device is further used to control the lifting device to drive the fitting piece to mate with the sleeve, and store the pressure detected by the pressure sensor.

20. The test device for detecting sealing performance of a one-way valve according to claim 18, further comprising a three-way valve and a gas extraction device, wherein a first valve of the three-way valve is communicated with the gas outlet pipe, a second valve of the three-way valve is communicated with the detection device, and a third valve of the three-way valve is communicated with the gas extraction device.

* * * * *